UNITED STATES PATENT OFFICE.

ALFRED BURGER, OF NEW BRIGHTON, NEW YORK.

PROCESS FOR THE PRODUCTION OF BORIC ACID.

1,108,129.     Specification of Letters Patent.     Patented Aug. 25, 1914.

No Drawing.     Application filed January 22, 1914. Serial No. 813,645.

*To all whom it may concern:*

Be it known that I, ALFRED BURGER, a citizen of Switzerland, and a resident of New Brighton, in the county of Richmond and State of New York, have invented certain new and useful Improvements in Processes for the Production of Boric Acid, of which the following is a specification.

My invention has for its object, a new and useful process for the production of boric acid and comprises generally the treatment of the products obtainable by calcining borates or boric-acid-containing minerals with corbon dioxid. By borates I means those minerals and earth-alkali-borates containing boric acid in such a form or combination that it can be eliminated therefrom by treatment with carbon dioxid, among which are colemanite, boronatrocalcite and pandermite.

I have found that whereas the production of boric acid by the action of carbon dioxid upon the borates in their natural condition, results in small yields, the necessity of enormous quantities of weak solutions of the acid and the expense incident to the evaporation of large amounts of water, boric acid can be produced much more easily and economically by first calcining the borates before treatment with carbon dioxid, by which process larger yields are obtained, smaller quantities of water are necessary, the strength of the acid solutions is materially increased and the amount of water to be evaporated is very greatly reduced. My process not only reduces the cost of boric acid obtainable from high grade borates, but also allows of its successful commercial production from low grade minerals which are not suitable for use in the present known processes.

When borates in their natural condition containing water of crystallization are treated with carbon dioxid in the presence of water, the resulting liquid contains but a small amount of boric acid, and this strength of solution cannot be materially increased by continued action of the carbon dioxid. In using colemanite, the solution contains only about 4% of boric acid, practically all of which remains in solution and does not separate out to any extent, thus necessitating the handling and evaporation of enormous quantities of water, and preventing the process from having any commercial importance. I have found however that if the colemanite be first calcined that the resulting products when treated with carbon dioxid in the presence of water yield solutions containing as high as 16% boric acid, and that the greater part of the boric acid separates out upon cooling, and that the filtrate obtained therefrom can be used over again in the first operation, thus obviating the necessity of all evaporation. The reaction upon the calcined products takes place much more rapidly than upon the uncalcined borates thus causing a saving in labor or expense incident to manufacture.

It would seem that the calcining of the borates, not only drives off the water of crystallization, but that it also converts the original borate into bodies more readily attacked by the carbon dioxid. It is probably that metaborates and tetraborates are formed, the calcium compounds of these being formed when colemanite is employed.

By treatment of these compounds with carbon dioxid gas there results a mixture of free boric acid and acid-calcium-borates and from the latter the boric acid may be recovered by any suitable means but I prefer to decompose them with acids, for instance, with hydrochloric acid forming calcium chlorid and boric acid, or with sulfuric acid forming calcium sulfate and boric acid.

The following is an example of one method of following my process:—Colemanite is calcined and 100 lbs. of this calcined product is thoroughly mixed with 500 lbs. water. During the calcination of the colemanite, the mineral is so disintegrated and broken up that usually it is not necessary to submit it to a grinding operation. The mixture is introduced into a suitable autoclave or closed receptacle and carbon dioxid gas is introduced under a pressure of about 100 lbs. The temperature should be maintained at about 50° C. When the operation is complete, which usually requires about ¾ of an hour, the mixture is filtered to remove the calcium carbonate, and hydrochloric acid slowly added to the filtrate until it shows slight acidity as indicated by methyl orange. The whole is then allowed to cool, and the precipitated boric acid removed by filtration. The solution contains some boric acid and calcium chlorid and can be used again to moisten the colemanite in the first operation, or the boric acid may be recovered from it by any suitable means. Acids other than hydrochloric acid may be employed, for instance, sulfuric acid in which case calcium sulfate would be produced and removed by filtration. The operation may be employed without pressure in which event, a longer time is required to complete the reactions. The temperature may also be varied, dependent upon the pressure employed.

What I claim, is:

1. The herein described process for the production of boric acid which comprises calcining a borate and treating the resulting products with carbon dioxid in the presence of water.

2. The herein described process for the production of boric acid which comprises mixing water with the products produceable by calcining earth-alkali-borates, treating with carbon dioxid gas decomposing the resultant acid-earth-alkali-borates, and separating the produced boric acid.

3. The herein described process for the production of boric acid which comprises calcining a boric-acid-containing mineral, mixing the resulting products with water, treating with carbon dioxid gas, adding a mineral acid, and separating the produced boric acid.

4. The herein described process for the production of boric acid which comprises calcining an earth-alkali-borate, mixing the resulting products with water, treating with carbon dioxid gas decomposing the resultant acid-earth-alkali-borates, under pressure, and separating the produced boric acid.

5. The herein described process for the production of boric acid which comprises mixing water with products produceable by calcining calcium-borates, treating with carbon dioxid gas, decomposing the resultant acid-calcium-borates, and separating the produced boric acid.

6. The herein described process for the production of boric acid which comprises calcining a calcium-borate, mixing the resulting products with water, treating with carbon dioxid gas under pressure, decomposing the resultant acid-calcium-borates, and separating the produced boric acid.

7. The herein described process for the production of boric acid which comprises calcining colemanite, mixing the resulting products with water, treating with carbon dioxid gas under pressure, adding a mineral acid, and separating the produced boric acid.

Signed at New Brighton in the county of Richmond and State of New York, this 17th day of January, 1914.

ALFRED BURGER. [L. S.]

Witnesses:
THOMAS V. BARRY,
HENRY F. CEMTAS.